United States Patent
Noyes et al.

(10) Patent No.: US 10,325,354 B2
(45) Date of Patent: Jun. 18, 2019

(54) DEPTH ASSISTED AUTO WHITE BALANCE

(71) Applicant: QUALCOMM Incorporated, San Diego, CA (US)

(72) Inventors: Ying Xie Noyes, San Diego, CA (US); Kyuseo Han, San Diego, CA (US); Ho Sang Lee, San Diego, CA (US); Hengzhou Ding, San Diego, CA (US); Leung Chun Chan, San Diego, CA (US); Loic Francois Segapelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/582,063

(22) Filed: Apr. 28, 2017

(65) Prior Publication Data

US 2018/0315166 A1   Nov. 1, 2018

(51) Int. Cl.
| | |
|---|---|
| *G06K 9/00* | (2006.01) |
| *G06T 5/00* | (2006.01) |
| *G06T 7/50* | (2017.01) |
| *G06T 7/60* | (2017.01) |
| *H04N 9/73* | (2006.01) |

(52) U.S. Cl.
CPC .................. *G06T 5/00* (2013.01); *G06T 7/50* (2017.01); *G06T 7/60* (2013.01); *H04N 9/735* (2013.01)

(58) Field of Classification Search
CPC ........... H04N 13/0271; H04N 13/0217; H04N 13/0257; H04N 13/0214; H04N 13/0253; H04N 5/23245; H04N 5/2226; G06K 9/4652; G06K 9/4661; G06K 9/6202; G06K 9/52; G06T 7/0065; G06T 7/408; G06T 7/50; G06T 5/00

See application file for complete search history.

(56) References Cited

U.S. PATENT DOCUMENTS

| | | | |
|---|---|---|---|
| 5,617,141 A | 4/1997 | Nishimura et al. | |
| 9,007,484 B2 | 4/2015 | Zhang et al. | |
| 9,154,684 B2 | 10/2015 | Lee et al. | |
| 2010/0225780 A1 | 9/2010 | Shimizu | |
| 2011/0187890 A1* | 8/2011 | Takayama | H04N 9/73 348/223.1 |
| 2011/0285825 A1* | 11/2011 | Tian | H04N 9/646 348/47 |
| 2012/0054575 A1* | 3/2012 | Karaoguz | G06T 15/205 714/752 |

(Continued)

OTHER PUBLICATIONS

International Search Report and Written Opinion—PCT/US2018/018773—ISA/EPO—dated Apr. 20, 2018, 16 pp.

(Continued)

*Primary Examiner* — Amir Alavi
(74) *Attorney, Agent, or Firm* — Shumaker & Sieffert, P.A.

(57) ABSTRACT

A method and apparatus for determining an auto white balance (AWB) gain based on determined depth information. The method may include receiving an image captured by an image sensor, determining depth information associated with the captured image, assigning weights to a plurality of illuminants based on the determined depth information, determining an auto white balance gain based on the assigned weights and statistics of the captured image, and applying the auto white balance gain to the captured image.

26 Claims, 7 Drawing Sheets

(56) References Cited

U.S. PATENT DOCUMENTS

| | | | |
|---|---|---|---|
| 2012/0147205 A1* | 6/2012 | Lelescu | G06T 3/4076 |
| | | | 348/218.1 |
| 2013/0307938 A1 | 11/2013 | Kim et al. | |
| 2014/0307054 A1 | 10/2014 | Chang et al. | |
| 2016/0125611 A1* | 5/2016 | Komatsu | G06T 7/55 |
| | | | 348/135 |
| 2016/0255334 A1* | 9/2016 | Wajs | G06T 7/571 |
| | | | 382/154 |
| 2016/0261783 A1 | 9/2016 | Elg et al. | |
| 2016/0277724 A1* | 9/2016 | Linaker | H04N 5/2226 |
| 2017/0295355 A1* | 10/2017 | Tanaka | G06T 7/593 |

OTHER PUBLICATIONS

Yang K-F., et al., "Efficient Illuminant Estimation for Color Constancy Using Grey Pixels," IEEE Conference on Computer Vision and Pattern Recognition (CVPR), Jun. 7, 2015, XP032793668, pp. 2254-2263.

* cited by examiner

DEPTH ASSISTED AUTO WHITE BALANCE

TECHNICAL FIELD

This disclosure generally relates to image and video processing, and more particularly, to techniques for auto white balance.

BACKGROUND

Image capture devices (e.g., digital cameras) are commonly incorporated into a wide variety of devices. In this disclosure, an image capture device refers to any device that can capture one or more digital images, including devices that can capture still images and devices that can capture sequences of images to record video. By way of example, image capture devices may comprise stand-alone digital cameras or digital video camcorders, camera-equipped wireless communication device handsets such as mobile telephones, cellular or satellite radio telephones, camera-equipped personal digital assistants (PDAs), computer devices that include cameras such as so-called "web-cams," or any devices with digital imaging or video capabilities.

Image capture devices may be capable of producing imagery under a variety of lighting conditions (e.g., illuminants). For example, image capture devices may operate in environments that include large amounts of reflected or saturated light, as well as in environments that include high levels of contrast. Some example image capture devices include an adjustment module for auto exposure control, auto white balance, and auto focus, in addition to other modules (e.g., a tint adjustment module), to adjust the processing performed by the imaging signal processor hardware.

In image capture devices, adjustment of the image signal processor ("ISP") is often beneficial to achieve proper white balance. White balance (sometimes called color balance, gray balance or neutral balance) refers to the adjustment of relative amounts of primary colors (e.g., red, green and blue) in an image or display such that neutral colors are reproduced correctly. White balance may change the overall mixture of colors in an image. Without white balance, the display of captured images may contain undesirable tints.

SUMMARY

In general, this disclosure describes techniques for performing an auto white balance (AWB) process and/or performing auto exposure control (AEC) using depth information captured or derived from an image sensor. Some modern image sensor types are able to generate depth information from the images being captured, including time-of-flight (TOF) cameras, dual image sensor systems, and cameras that use a dual photodiode (2PD) sensor. Depth information may be used to determine the distances of objects in the scene relative to the camera. In one example, an image capture device may be configured to use the captured depth information to more accurately determine an illuminant for an AWB process. In another example, an image capture device may be configured to use the captured depth information to more accurately identify the subject of interest of an image and determine AEC settings accordingly.

In one example of the disclosure, a method for image processing, comprises receiving an image captured by an image sensor, determining depth information associated with the captured image, assigning weights to a plurality of illuminants based on the determined depth information, determining an auto white balance gain based on the assigned weights and statistics of the captured image, and applying the auto white balance gain to the captured image.

In another example of the disclosure, an apparatus configured for image processing comprises a memory configured to store an image captured by an image sensor, and one or more processors configured to receive the image, determine depth information associated with the captured image, assign weights to a plurality of illuminants based on the determined depth information, determine an auto white balance gain based on the assigned weights and statistics of the captured image, and apply the auto white balance gain to the captured image.

In another example of the disclosure, an apparatus configured for image processing comprises means for receiving an image captured by an image sensor, means for determining depth information associated with the captured image, means for assigning weights to a plurality of illuminants based on the determined depth information, means for determining an auto white balance gain based on the assigned weights and statistics of the captured image, and means for applying the auto white balance gain to the captured image.

In another example, this disclosure describes a non-transitory computer-readable storage medium storing instructions that, when executed, causes one or more processors for image processing to receive an image captured by an image sensor, determine depth information associated with the captured image, assign weights to a plurality of illuminants based on the determined depth information, determine an auto white balance gain based on the assigned weights and statistics of the captured image, and apply the auto white balance gain to the captured image.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
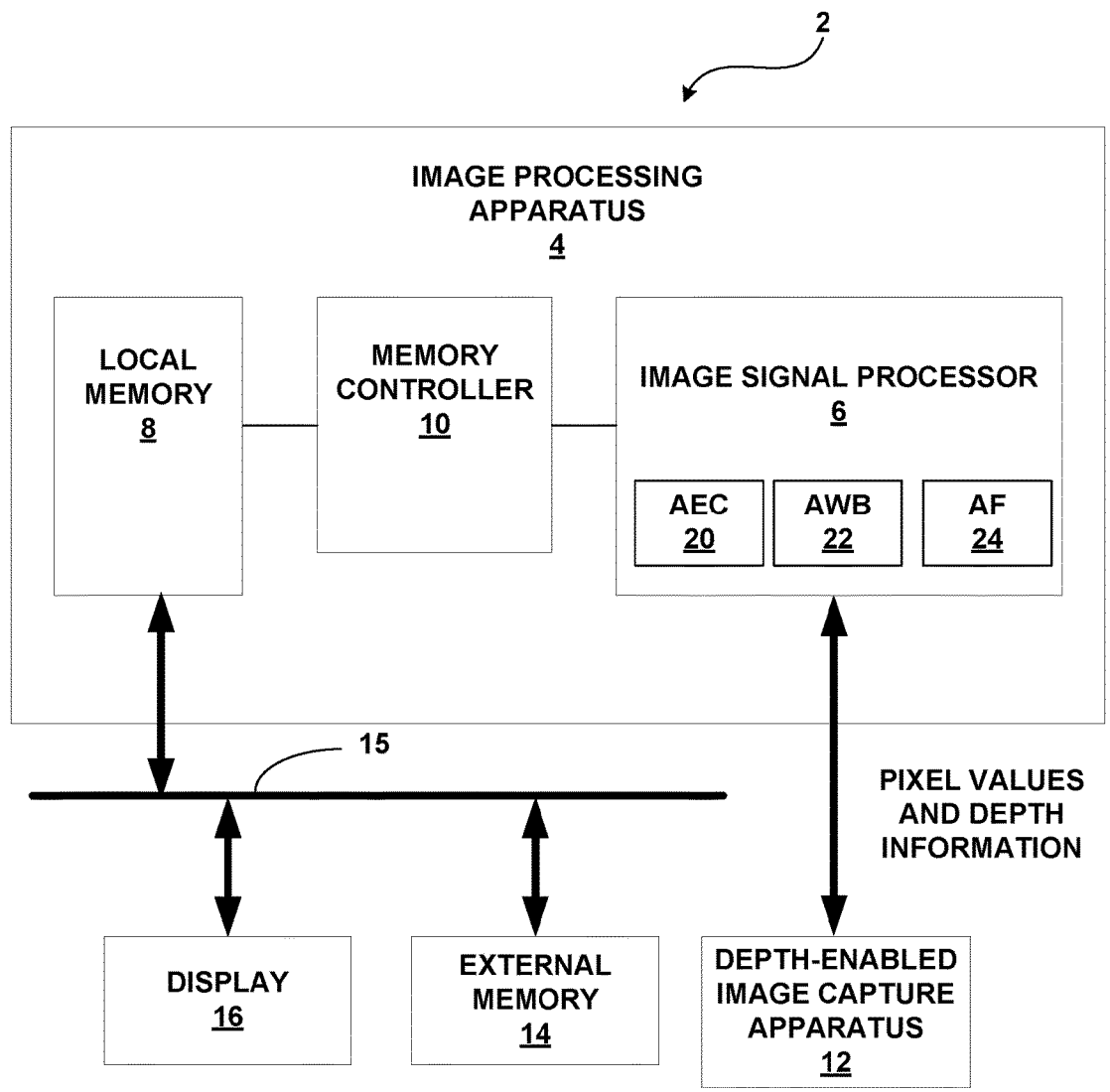
FIG. 1 is block diagram of an exemplary device that may implement techniques for determining illuminants to support an automatic white balance process in accordance with this disclosure.

This disclosure describes image processing techniques that facilitate the determination of a lighting condition (sometimes referred to as the illuminant condition or color temperature) associated with an image obtained by an image sensor, such as a camera (e.g., a digital camera). The perceived colors of objects are dependent on the type of light (e.g. the lighting condition or illuminant) that is illuminating the object (e.g., indoor incandescent light, indoor fluorescent light, daylight at noon, daylight in late afternoon, etc.). Once the illuminant is determined, a white balance process can be performed on the image. The white balance process may involve application of white balance gains and/or scaling to respective colorimetric channels of the image (e.g., RGB, XYZ, or YUV color channels). The gains may be defined for the illuminant for the white balance process. White balance is a process used to correct for image sensor responses in order to better match an image with a user's perceptual experience of the object being imaged. As an example, the white balance process is designed to make gray objects actually appear gray in the processed image.

If an incorrect illuminant is identified, white balance can impair image quality in some cases. If the correct illuminant is identified, however, white balance usually improves image quality. As mentioned above, gains and/or scaling can then be applied to various color channels so that the white area actually appears white. This often improves the color fidelity of saturated color areas of an image as well, by adjusting those colors using the gains from the white balance process. The gains or scaling applied to achieve white balance may be predetermined for different illuminants. Accordingly, it is beneficial to determine the approximate illuminant applicable to an image so that an appropriate set of white balance gains can be selected.

In some examples, a user of an image capture device may select or indicate an illuminant under which an image was captured. In other examples, the image capture device itself may automatically determine the most likely illuminant and perform white balancing based on the determined light condition. Such a process is sometimes referred to as automatic white balance (AWB). In order to better reflect the colors of a scene, an AWB algorithm on a camera may attempt to determine the illuminants of the scene, and set the white balance accordingly. However, AWB algorithms have difficulty setting the white balance in some situations. For example, gray and blue have very similar color properties under different illuminants. Accordingly, when there is both gray (e.g., a building) and blue (e.g., the sky) colors in the same scene, an incorrect AWB setting may cause one of the colors to be displayed incorrectly. For example, the camera may capture the sky as gray instead of blue.

This disclosure describes techniques for improving the determination of actual illuminants associated with an image. In general, as part of performing an AWB process, an image processing apparatus may use depth information captured with an image to more accurately determine the illuminants under which the image was captured. The determined illuminant may then be used to perform an AWB process on the captured image.

For example, if all objects in the scene are close to the camera, as indicated by the captured depth information, it may be more likely that the scene is indoors, and thus an indoor illuminant (e.g., incandescent light, fluorescent light, etc.) is selected. If all objects in the scene are far from the camera, as indicated by the captured depth information, it may be more likely that the scene is outdoors, and thus an outdoor color temperature (e.g., daylight) is selected. For the example above with the gray building next to the blue sky, an AWB algorithm that uses depth information may be able to determine that some objects are near the camera (e.g., the building), while other objects are very far from the camera (e.g., the sky). In this case, the AWB algorithm may more accurately select an outdoor color temperature for AWB, and as such, may more accurately capture the sky as blue and the building as gray.

This disclosure also describes techniques for making auto exposure control (AEC) decisions based on captured depth information. AEC involves automatically determining, among other settings, an aperture size and a shutter speed for capturing a particular image. AEC techniques typically prioritize the exposure to particular areas of the image based on one or more predetermined criteria. For example, AEC can be prioritized to center objects in the scene, a detected face in the scene, to an area of the scene (including the entire scene) that optimizes a histogram of luma values present in the scene, and so forth. A particular AEC algorithm may use multiple priorities and assign weights to each priority. In essence, an AEC algorithm seeks to determine what the photographer has intended as the actual subject of the image, and to make exposure control settings based on that determination. However, even given the various priorities that may be used to perform AEC, exposure settings may not be optimal for every situation.

For AEC, depth information may be used as a priority for determining exposure settings. In one example, depth information may be used to prioritize close-up objects, and an AEC algorithm may be configured to use closer objects as a priority for exposure control. As another example, depth information can also be used to increase the confidence that the picture being taken is a landscape scene. For example, if all objects in the scene are far away, as indicated by the depth information, exposure settings may be more likely to be set using a frame average of luminance values (e.g., as opposed to setting exposure more locally, as for a face). In some examples, depth information may be used as one of many priorities for determining exposure settings, and may be weighted according to some predetermined preference. For example, it may be preferable to assign higher weights to center object and face detection priorities, with lower weights assigned for optimized histograms or object distance (e.g., the depth information). In this way, the depth information may be used to assist in determining exposure settings when other higher priorities are inconclusive.

FIG. 1 is a block diagram illustrating a device 2 that may be configured to perform the techniques of this disclosure. Device 2 may form part of an image capture device, or a digital video device capable of coding and transmitting and/or receiving video sequences. By way of example, device 2 may comprise a stand-alone digital camera or video camcorder, a wireless communication device such as a cellular or satellite radio telephone, a personal digital assistant (PDA), a tablet computer, a laptop computer, a so-called "smartphone," or any device with imaging or video capabilities in which image processing is desirable.

As shown in FIG. 1, device 2 includes an image processing apparatus 4 to store raw image data and perform various processing techniques on such data. Apparatus 4 may comprise a so called "chip set" that includes a digital signal processor (DSP) on-chip memory, and possibly hardware logic or circuitry. More generally, apparatus 4 may comprise any combination of processors, hardware, software or firmware, and the various components of apparatus 4 may be implemented as such. Also, apparatus 4 may comprise a single integrated chip or an encoder/decoder (CODEC), if desired.

In the illustrated example of FIG. 1, image processing apparatus 4 includes a local memory 8, a memory controller 10 and an image signal processor 6. Image signal processor 6 may be a general-purpose processing unit or may be a processor specially designed for imaging applications for a handheld electronic device. As shown, image signal processor 6 is connected to, and in data communication with, local memory 8 and external memory 14. In some examples, local memory 8 may be incorporated in image signal processor 6, for example, cache memory.

As shown in FIG. 1, image signal processor 6 may be configured to execute an AEC process 20, an AWB process 22, and an auto focus (AF) process 24. In some examples, image signal processor 6 may include hardware-specific circuits (e.g., an application-specific integrated circuit (ASIC)) configured to perform the AEC, AWB, and/or AF processes. In other examples, image signal processor 6 may be configured to execute software and/or firmware to perform the AEC, AWB, and/or AF processes. When configured in software, code for AEC process 20, AWB process 22, and/or AF process 24 may be stored in local memory 8 and/or external memory 14. In other examples, image signal processor 6 performs the AEC, AWB, and/or AF processes using a combination of hardware, firmware, and/or software. When configured as software, AEC process 20, AWB process 22, and/or AF process 24 may include instructions that configure image signal processor 6 to perform various image processing and device management tasks, including the AWB and AEC techniques of this disclosure.

AEC process 20 may include instructions for configuring, calculating, and/or storing an exposure setting of depth-enabled image capture apparatus 12. An exposure setting may include the shutter speed and aperture setting to use to capture. In accordance with techniques of this disclosure, image signal processor 6 may use depth information captured by depth-enabled image capture apparatus 12 to better identify the subject of an image and make exposure settings based on the identified subject. AF process 24 may include instructions for configuring, calculating and/or storing an auto focus setting of depth-enabled image capture apparatus 12.

AWB process 22 may include instructions for configuring, calculating and/or storing an AWB setting (e.g., an AWB gain) that may be applied to an image captured by depth-enabled image capture apparatus 12. Image signal processor 6 may be configured to perform the techniques of this disclosure for depth-assisted AWB processing and/or depth-assisted AEC. In particular, as described in greater detail below, image signal processor 6 may use depth information received or generated from data produced by depth-enabled image capture apparatus 12 to determine an AWB gain that may be used in determining a current illuminant. In one example of the disclosure, image signal processor 6 may be configured to receive an image captured by an image, and determine depth information associated with the captured image. Image signal processor 6 may be further configured to assign weights to a plurality of illuminants based on the determined depth information, determine an auto white balance gain based on the assigned weights and statistics of the captured image, determine a current illuminant based on the determined current auto white balance gain, and apply the auto white balance gain to the captured image.

Local memory 8 stores raw image data, and may also store processed image data following any processing that is performed by image processing unit 6. Local memory 8 may be formed by any of a variety of non-transitory memory devices, such as dynamic random access memory (DRAM), including synchronous DRAM (SDRAM), magnetoresistive RAM (MRAM), resistive RAM (RRAM), or other types of memory devices. Memory controller 10 controls the memory organization within local memory 8. Memory controller 10 also controls memory loads from local memory 8 to image signal processor 6, and write backs from image signal processor 6 to local memory 8. The images processed by image signal processor 6 may be loaded directly into image signal processor 6 from depth-enabled image capture apparatus 12 following image capture, or may be stored in local memory 8 during the image processing.

As noted, device 2 may include a depth-enabled image capture apparatus 12 to capture the images that are processed, although this disclosure is not necessarily limited in this respect. Depth-enabled image capture apparatus 12 may comprise arrays of solid state sensor elements such as complementary metal-oxide semiconductor (CMOS) sensor elements, charge coupled device (CCD) sensor elements, or the like. Alternatively, or additionally, depth-enabled image capture apparatus 12 may comprise a set of image sensors that include color filter arrays (CFAs) arranged on a surface of the respective sensors. Depth-enabled image capture apparatus 12 may be coupled directly to image signal processor 6 to avoid latency in the image processing. Depth-enabled image capture apparatus 12 may be configured to capture still images, or full motion video sequences, in which case the image processing may be performed on one or more image frames of the video sequence.

In accordance with the techniques of this disclosure, depth-enabled image capture apparatus 12 may include sensors or other features that allow depth-enabled image capture apparatus 12 to capture depth information, in addition to pixel values, from an image being captured. In some examples, the depth information is captured directly by depth-enabled image capture apparatus 12. In other examples, depth information may be derived by image signal processor 6 from the image data captured by depth-enabled image capture apparatus 12.

Depth-enabled image capture apparatus 12 may be any camera system or sensor type from which depth information is directly captured, or through which depth information may be determined through some post-processing. Example camera systems or sensor types that provide depth information may include time-of-flight (TOF) cameras, dual image sensor systems, and dual photodiode (2PD) sensors. A TOF camera is a camera that uses one or more lasers to determine the distance between the camera and objects within a scene that is being capture.

In a dual camera system, two cameras positioned at a predetermined distance apart from one another may both capture an image at the same time. Since each of the cameras captures the image from a different viewpoint, image signal processor 6 may make triangulation calculations from the corresponding points in the two images to determine the depth (e.g., distance from the camera) at each pixel.

Image signal processor 6 may determine depth from image data captured by a 2PD sensor using a defocus value. Rather than using two different cameras to capture corresponding points of an image from different viewpoints, a 2PD sensor may use only a single camera, but the sensor itself includes two sensors per pixel.

Depth-enabled image capture apparatus 12 may send depth information, pixel values (e.g., in a Bayer or RGB format), and/or raw statistics messages describing the captured image to image signal processor 6. The information obtained from depth-enabled image capture apparatus 12 may be used in AEC process 20 and AWB process 22, as will be described in more detail below. In general, image signal processor 6 may be configured to analyze the raw statistics and depth information to calculate and/or determine imaging parameters, such as sensor gain, R/G/B gain, AWB gain, shutter speed, aperture size, and the like. The calculated and/or determined imaging parameters may be applied to the captured image and/or sent back to depth-enabled image capture apparatus 12 to adjust exposure and/or focus setting.

Device 2 may include a display 16 that displays an image following the image processing described in this disclosure. After such image processing, the image may be written to local memory 8 or external memory 14. The processed images may then be sent to display 16 for presentation to the user. Display 16 may display other information, including visual representations of files stored in a memory location (e.g., external memory 14), software applications installed in image signal processor 6, user interfaces, network-accessible content objects, and other information.

In some examples, device 2 may include multiple memories. For example, device 2 may include an external memory 14, which typically comprises a relatively large memory space. External memory 14, for example, may comprise dynamic random access memory (DRAM), or FLASH memory. In other examples, external memory 14 may comprise a non-volatile memory or any other type of data storage unit. In contrast to external memory 14, local memory 8 may comprise a smaller and faster memory space, although this disclosure is not necessarily limited in this respect. By way of example, local memory 8 may comprise SDRAM. In any case, external memory 14 and local memory 8 are merely exemplary, and may be combined into the same memory part, or may be implemented in a number of other configurations.

Device 2 may also include a transmitter (not shown) to transmit the processed images or coded sequences of images to another device. Indeed, the techniques of this disclosure may be used in handheld wireless communication devices (such as so-called smartphones) that include digital camera functionality or digital video capabilities. In that case, the device would also include a modulator-demodulator (MO-DEM) to facilitate wireless modulation of baseband signals onto a carrier waveform in order to facilitate wireless communication of the modulated information.

Local memory 8, display 16 and external memory 14 (and other components if desired) can be coupled via a communication bus 15. A number of other elements may also be included in device 2, but are not specifically illustrated in FIG. 1 for simplicity and ease of illustration. The architecture illustrated in FIG. 1 is merely exemplary, as the techniques described herein may be implemented with a variety of other architectures.

As noted above, white balance can be an important process for digital camera applications or other applications that present images to users. Again, white balance is typically used to correct an image captured by an image sensor in order to better match the colors of the captured image with a human viewer's perceptual experience of the object being captured. Essentially, white balance is a process of identifying one or more colors in an image that should appear white under the identified lighting. Gains or other scaling can then be applied to various color channels of the image so that the white area actually appears white. White balance typically refers to this process of scaling the color channels to adjust for illuminants. The scaling of color channels associated with a digital image can often improve the color fidelity of saturated color areas of an image as well by adjusting those colors using the gains from the white balance process.

However, white balance is dependent upon the illuminant identified for an image. If the wrong illuminant is identified, white balance can actually impair image quality in some cases. If the correct illuminant is identified, however, white balance usually improves image quality. According to the techniques of this disclosure, techniques are described for improving the determination of actual illuminants associated with an image. In particular, this disclosure describes techniques whereby image signal processor 6 uses depth information of a captured image to improve the accuracy of determining an illuminant for an AWB process.

Figure 2:
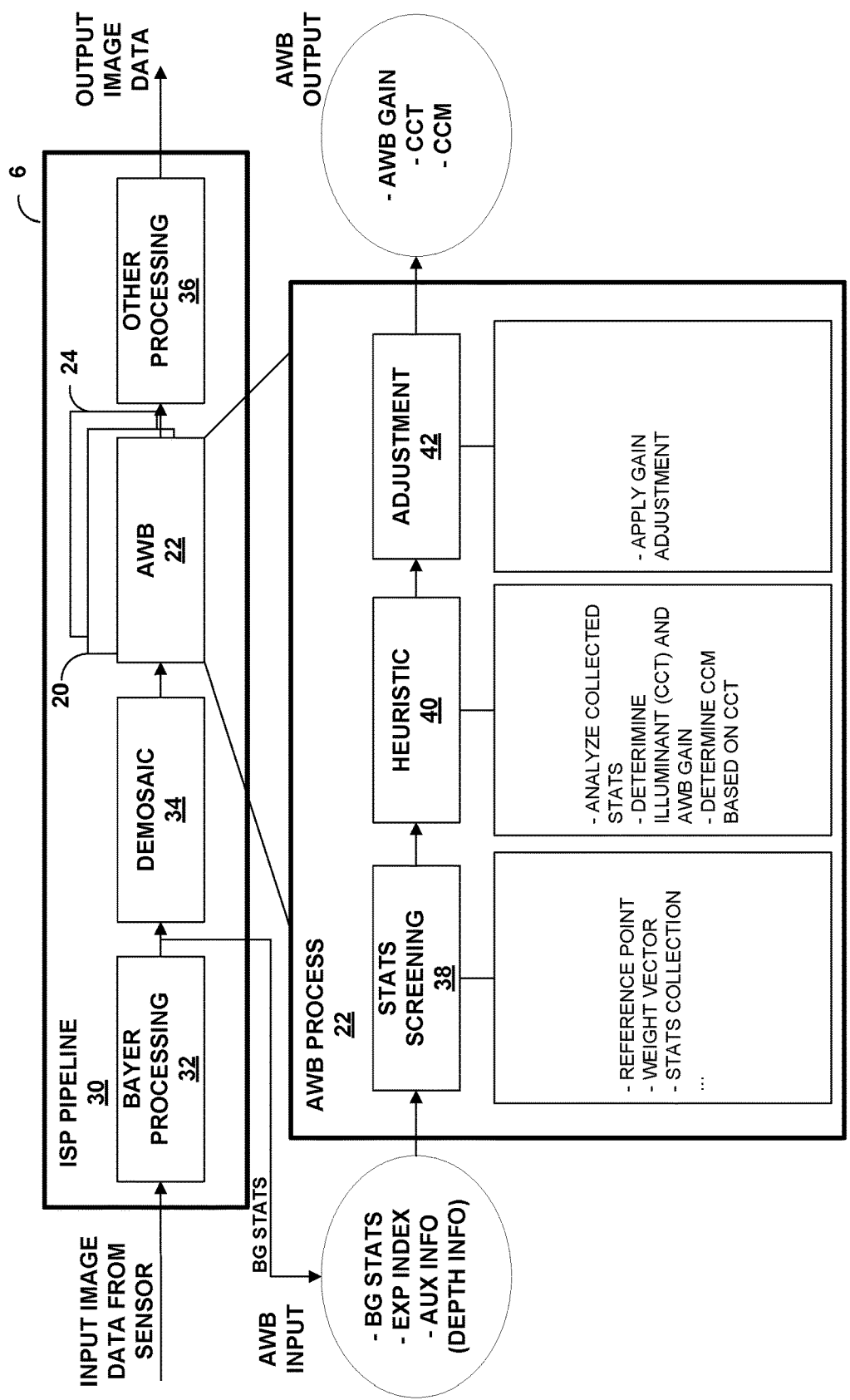
FIG. 2 is a block diagram showing the operation of an image signal processor performing an automatic white balance process in more detail.

FIG. 2 is a block diagram showing the operation of an image signal processor performing an automatic white balance process in more detail. Image signal processor 6 may be configured to execute an image signal processing (ISP) pipeline 30 to process image data input to image signal processor 6. The example of FIG. 2 is focused on AWB process 22. However, ISP pipeline 30 may also include AEC process 20 and AF process 24, which may be performed in parallel, or serially, with AWB process 22.

In the example of FIG. 2, image signal processor 6 receives input image data from depth-enabled image capture apparatus 12. In some examples, such as shown in FIG. 2, the input image data will include color data of the image as well as depth information. In some examples, each pixel of image data will have a corresponding depth value (e.g., distance from the camera to the object corresponding to the captured pixel). In other examples, each region of an image (e.g., a predefined area of two or more pixels) will have corresponding depth information. In other examples, such as when the depth-enabled image capture apparatus 12 uses a dual camera system, image signal processor 6 may be configured to perform triangulation calculations to obtain depth information associated with the pixels of the image. In examples when the depth-enabled image capture apparatus 12 uses a 2PD sensor, image signal processor 6 may determine depth information based on a defocus value. However, it should be understood that any method for obtaining depth information associated with an image may be used in conjunction with the techniques of this disclosure.

In the example of FIG. 2, the color data received for the input image is in a Bayer format. Rather than capturing red (R), green (G), and blue (B) values for each pixel of an image, image sensors may use a Bayer filter mosaic (or more generally, a color filter array (CFA)), where each photosensor of a digital photo sensor captures a different one of the RGB colors. Typical filter patterns for a Bayer filter mosaic include 50% green filters, 25% red filters, and 25% blue filters.

Bayer processing unit 32 may perform one or more initial processing techniques on the raw Bayer data received by image signal processor 6, including, for example, black level subtraction, rolloff correction, bad pixel correction, and/or denoising. Demosaic processing unit 34 may be configured to convert the processed Bayer image data into RGB values for each pixel of the image. As explained above, Bayer data may only include values for one color channel (R, G, or B) for each pixel of the image. Demosaic processing unit 34 may determine values for the other color channels of a pixel by interpolating from color channel values of nearby pixels.

AWB process 22 analyzes information relating to the captured image to determine an illuminant, from among a plurality of possible illuminants, and determines an AWB gain to apply to the captured image. As shown in FIG. 2, example inputs to AWB process 22 includes Bayer grade (BG) statistics of the captured image, an exposure index (e.g., the brightness of the captured image), and auxiliary information, which may include depth information. The BG statistics represent the actual raw color values in the captured image in the Bayer domain. However, it should be understood that it is not necessary to use BG statistics, and instead, RGB values of each pixel after demosaicing may also be used in AWB process 22.

Stats screening process 38 identifies pixel values in the image that are close to gray tones (e.g., called near-gray pixels) as defined by various different illuminants. That is, what color values are considered to be gray may be different for each of a plurality of illuminants. Gray values for various illuminants may be pre-defined and stored as a reference point for each illuminant.

As one example, seven different illuminants may be defined using reference points that are calibrated according to the following TABLE 1.

TABLE 1

| Illuminant | R/G Ratio | B/G Ratio |
|---|---|---|
| D65 (outdoor-midday) | 0.65 | 0.83 |
| Shade (outdoor) | 0.60 | 0.90 |
| Incandescent (indoor) | 1.10 | 0.51 |
| Cool White (indoor) | 0.76 | 0.54 |
| Warm Fluorescent (indoor) | 0.87 | 0.59 |
| Horizon (outdoor) | 1.28 | 0.46 |
| D50 (outdoor) | 0.77 | 0.69 |

Each of the illuminants in Table 1 is a pre-defined standard that is intended to represent a theoretical source of visible light for a given sensor module used by depth-enabled image capture apparatus 12. Colors, including gray values and white values, will look different to the human eye under different light sources. Stats screening process 38 may consider more or fewer illuminants than shown in Table 1. In general, stats screening process 38 may consider both a plurality of indoor illuminants (e.g., as produced by various types of light bulbs) as well as a plurality of different outdoor illuminants (e.g., as produced by the sun at different parts of the day or in different conditions).

As can be seen in Table 1, reference point gray values may be defined based on a ratio of RIG values in a pixel and/or B/G values in a pixel. Based on these parameters, gray point lines can be defined for each respective illuminant in a three-dimensional color space. For comparison purposes, a bounding rectangle on the Cb-Cr (blue and red chroma values) domain can also be obtained to collectively bound all of the gray point lines.

Stats screening process 38 identifies near-gray pixels of an image for a plurality of different illuminants based on the statistics of the image (e.g., R/G and or B/G ratios of a pixel or region of an image). In some examples, stats screening process 38 identifies the near-gray pixels based on gray point lines defined for the different illuminants (e.g., the reference points) and bounding volumes (e.g., cylindrical bound volumes) defined around the gray point lines. For example, gray point lines may be defined in a three-dimensional color space for the different illuminants. These gray point lines define actual gray colors for the respective illuminants, and generally differ within the three-dimensional color space for the different illuminants. In other words, different illuminants define different gray point lines within the same color space. For each of the gray point lines associated with the different illuminants, a cylindrical bounding volume is defined about the respective gray point lines. In one example, a radius of approximately six pixels may be used to define the cylindrical bounding volumes about the respective gray point lines.

In some examples, image signal processor 6 may simply select the illuminant having the most number of near-gray pixels associated with the respective bounding volume. However, the number of near-gray pixels associated with a particular illuminant may not always be an optimal criterion for determining the illuminant for a particular image. Consider the example of captured image 50 shown in FIG. 3, which includes a cloudy sky that is generally blue in color in the same image as a building that is generally gray in color.

Figure 3:
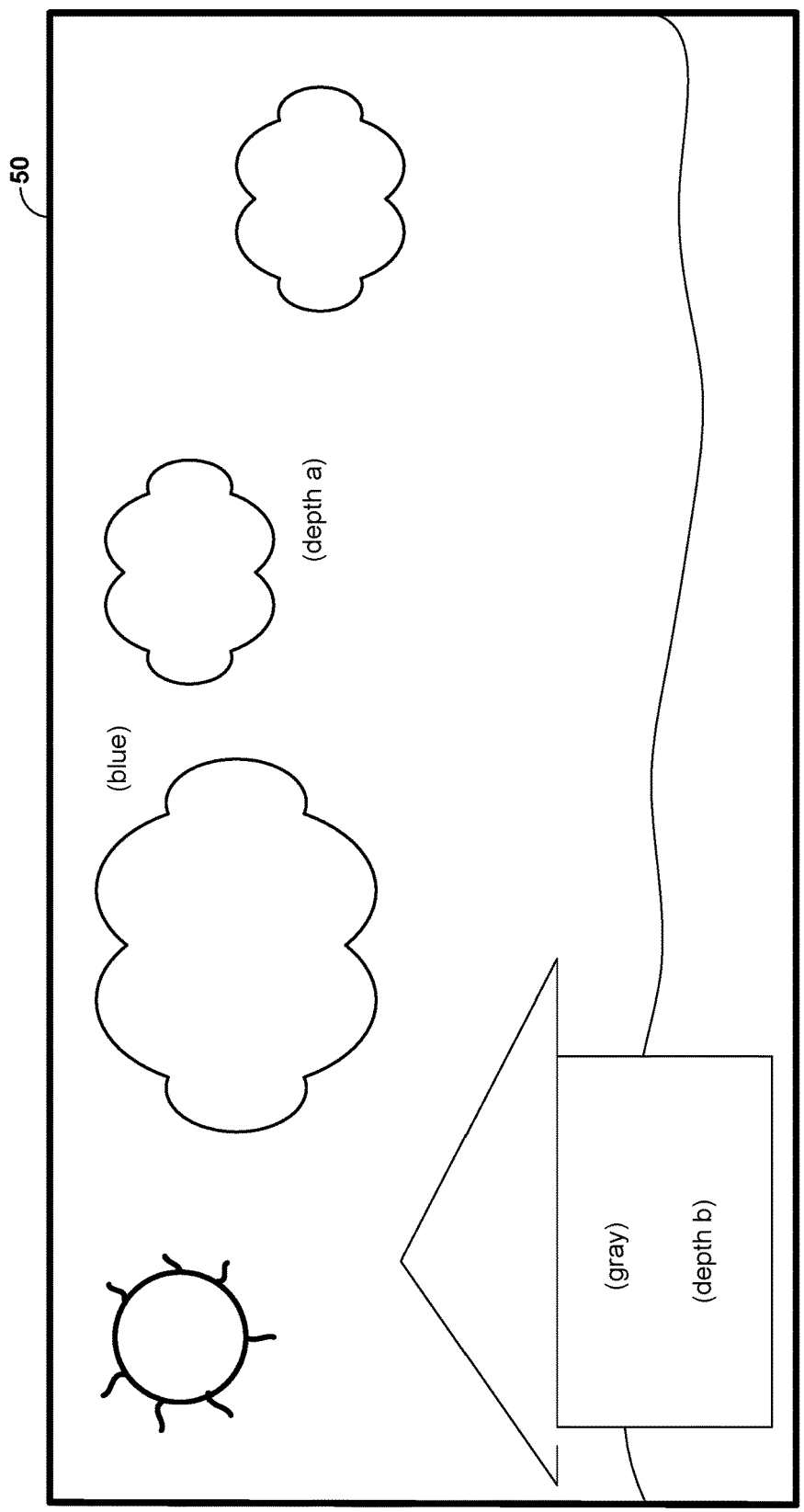
FIG. 3 is a conceptual diagram illustrating an example image with associated depth information.

In accordance with the techniques of this disclosure, image signal processor 6 and/or depth-enabled image capture apparatus 12 may be configured to determine and/or capture depth information associated with the captured image. Each pixel and/or region (e.g., group of pixels) of the captured image may have associated depth information. In the example of FIG. 3, the sky and/or clouds may have an associated depth a, and the building may have an associated depth b, etc. In general, the value for depth a will represent a distance that is far from the camera, and depth b will be closer to the camera than depth a. Due to the similarity in statistics between gray and blue tones, it may be difficult for some AWB processes to determine an optimal illuminant for such an image.

Figure 4:
FIG. 4 is conceptual diagram illustrating example image statistics.
Figure 4:
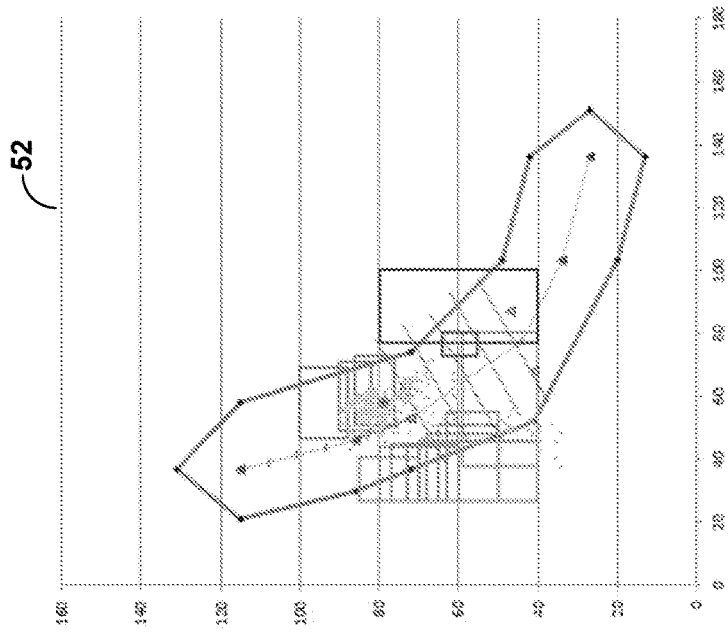

FIG. 4 is a conceptual diagram illustrating example image statistics. As shown in FIG. 4, the BG stats in plot 52 representing the blue tones in the cloudy sky are very close to the BG stats in plot 54 representing the gray tones in the building. In this situation, the blue sky may fall within near-gray bounding volumes for one illuminant, while the gray building may fall within near-gray bounding values for a different illuminant. If the incorrect illuminant is chosen (e.g., the illuminant which considers the blue sky to be gray), then a white balance gain chosen for the image may incorrectly adjust the colors in the image to make the sky look gray instead of blue.

Returning to FIG. 2, to alleviate ambiguities in illuminant selection, stats screening 38 may assign weight values to various illuminants based on depth information associated with the captured image. For example, the depth information of the image may be used to set a probability (e.g., as indicated by a weight value) that one of the particular predefined illuminants is closest to the illuminant under which the picture was taken. In this way, AWB process 22 may use both the number of near-gray pixels identified for a particular illuminant in conjunction with a probability, as indicated by the weight value, that a particular illuminant is likely to be close to the actual illuminant.

For example, for the statistics of the image in FIG. 3, it may be that stats screening process 38 may have identified about the same number of near-gray pixels for the D65 illuminant (sunlight at midday) as for a shade illuminant. However, stats screening process 38 may use the depth information captured and/or determined for captured image 50 of FIG. 3, and assign relatively higher weights to outdoor D65 illuminants and assign relatively lower weights to heavy shade illuminants (e.g., D75). Stats screening process 38 may be able to make this decision based on captured image 50 containing depth information that indicates that at least a portion of the image is far away from the camera. Such far depth information would tend to indicate that a portion of the image is the sky, and thus image 50 was captured outside.

In one example of the disclosure, stats screening process 38 may assign weights to various predetermined illuminants based on a determination, using the captured depth information, of whether or not the image was captured indoors or outdoors. Stats screening process 38 may determine whether the image was captured indoors or outdoors, or the relative likelihood of whether the image was captured indoors or outdoors, based on one or more different functions of the depth information of the captured image. For example, stats screening process 38 may determine the probability of whether the image was captured indoors or outdoors based on a maximum depth of the depth information compared to predetermined threshold(s), an average depth of the depth information compared to predetermined threshold(s), and/or a difference between a minimum and a maximum depth of the depth information compared to predetermined threshold(s). In general, the larger the values of depth information associated with the image, the more likely it is that the image was capture outdoors under outdoor-related illuminants.

Figure 5:
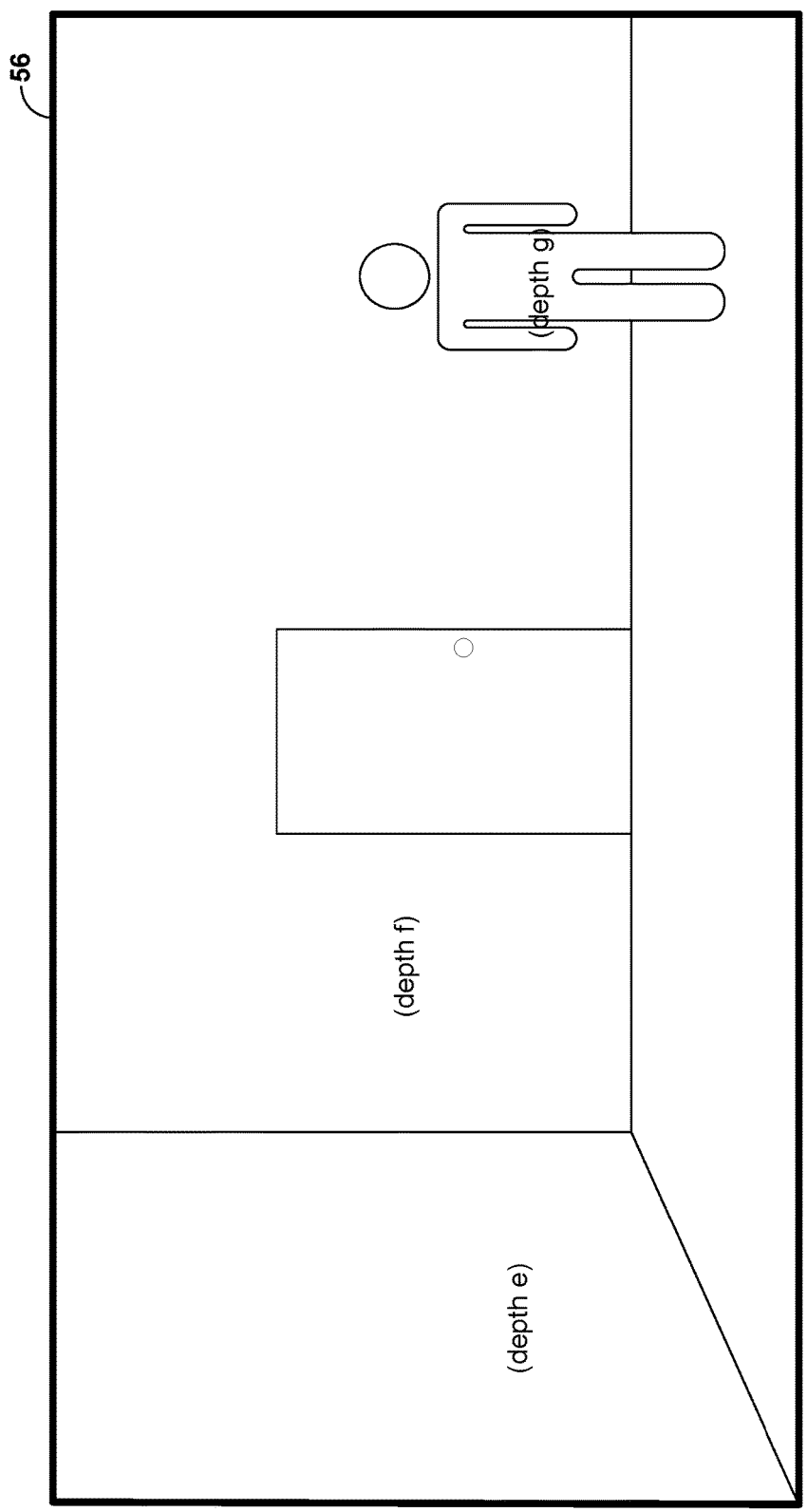
FIG. 5 is a conceptual diagram illustrating an example image with associated depth information.

In the case that stats screening process 38 determines that the depth information indicates that it is more likely than not that the image was captured outdoors, stats screening process 38 may be configured to assign relatively higher weights to outdoor illuminants of the plurality of illuminants, and assign relatively lower weights to indoor illuminants of the plurality of illuminants. In the case that stats screening process 38 determines that the depth information indicates that it is more likely than not that the image was captured indoors, stats screening process 38 may be configured to assign relatively lower weights to outdoor illuminants of the plurality of illuminants, and assign relatively higher weights to indoor illuminants of the plurality of illuminants. FIG. 5 shows an example of an image 56 where the relative and comparative depth values of the image indicate a higher probability of the image being captured indoors. For example, the depth of the near wall (depth e), the far wall (depth f), and the person (depth g) in the image may all be below a threshold depth that would indicate the image was captured indoors.

In some examples, the wall at depth f may be a color whose statistics (e.g., R/G statistics) suggest a gray color for various outdoor illuminants (e.g., an outdoor D65 illuminant, an outdoor sunny illuminant, etc.). However, the color of the wall at depth e and colors on the clothing of the person at depth g may have R/G statistics that suggest a gray color for various indoor illuminants. As discussed above, the depth information for the image at FIG. 5 includes depths that are all relatively close to the camera. Accordingly, it is more likely than not that the image was captured indoors under an indoor illuminant. As such, stats screening process 38 may assign relatively low weights to the colors at depth f whose R/G statistics are closer to pre-defined gray points for outdoor illuminants. Likewise, stats screening process 38 may assign relatively higher weights to the colors at depth e and depth g whose R/G statistics are close to pre-defined gray points for indoor illuminants.

Returning to FIG. 2, after statistics collection and weight assignment for the various illuminants, heuristic process 40 may determine an auto white balance gain for the captured image. Heuristic process 40 may be configured to analyze the collected statistics of the image (e.g., the number of near-gray pixels identified per illuminant) as well as the weights assigned to each illuminant (or the pixel statistics associated with the illuminant) based on the depth information. In some examples, heuristic process 40 selects one of the illuminants based on the near-gray pixels identified for the different illuminants based at least in part on a pixel count for that respective illuminant multiplied by the assigned weight. In other words, heuristic process 40 may use the pixel statistics associated with the most probable (as defined by the assigned weights) respective illuminant to determine the auto white balance gain. The most probable respective illuminant may be the illuminant for which the most pixels (e.g., R/G pixel statistics) of the image fall within the defined bounding volume for that illuminant. In this sense, the techniques of this disclosure may rely somewhat on the "gray world assumption," insofar as the illuminant for which the most pixels of the image fall within the defined bounding volume can used for determining the auto white balance gain. Other factors, however, may also be used along with the pixel counts and depth-related weighting to determine the auto white balance gain, including the number of green pixels in the image, the number of blue pixels in the image, and/or the intensity of the pixels of the image. The determined auto white balance gain is a scaling factor that may be multiplied to the pixel values of the image in order to make white and gray pixels in the image appear correctly white and gray for a particular illuminant.

The auto white balance gain determined by heuristic process 40 may be used to determine a current illuminant. In this context, the "current" illuminant is the illuminant that most closely matches the lighting conditions for the current image being processed. Each of a plurality of pre-defined illuminants may have associated pre-defined auto white balance gains. Heuristic process 40 may compare the auto white balance gain determined using the depth information, as described above, with the pre-defined auto white balance gains associated with the plurality of illuminants. Heuristic process 40 selects the illuminant with the associated pre-defined auto white balance gain that most closely matches the determined auto white balance gain as the current illuminant. The current illuminant selected by heuristic process 40 may be defined by a correlated color temperature (CCT). A CCT is a measure of the appearance of the colors of a light source relative to a blackbody.

In addition, based on the CCT of the determined current illuminant, heuristic process 40 may optionally determine a color correction matrix (CCM) to apply to the white balance adjusted image. A CCM may be used in a color balance process to adjust the intensities of colors. Often, given a particular CCT, it is preferable to adjust the colors in an image so that warmer or cooler tones are more prevalent.

Once the AWB gain is determined, adjustment process 42 may apply the determined AWB gain to the image. In particular, adjustment process 42 typically involves applying AWB gains to colorimetric channels (e.g., RGB) of the image. As an example, adjustment process 42 may determine a white reference area in the image, and then adjust that area as well as other areas of the image by applying selected gains (for that illuminant) on the color channels in order to improve the whiteness of the white reference area. The application of these gains to color channels may also improve color fidelity of areas of the image that exhibit highly saturated colors.

After AWB process 22 is completed, other processing unit 36 may apply additional processing to the image. The additional processing may include color, tone, and/or spatial processing of the image. For example, other processing unit 36 may use the CCM generated from the CCT of the determined current illuminant current illuminant to apply a color balance process to the image.

For AEC process 20, depth information may be used as a priority for determining exposure settings. In some example images, it may be difficult for image signal processor 6 to automatically determine the intended subject of an image. Consider the example of FIG. 6 that includes a large amount of sky, a person, and an object (a soda can). Some AEC algorithms, given the large amount of light in the scene, may determine that the subject of the image is a landscape. In that example, auto exposure settings may be made so to best optimize a histogram of all brightness values in the image (i.e., so most of the landscape is properly exposed). In other AEC algorithms, priority for exposure settings may be given to detected faces. In still other AEC algorithms, priority for exposure settings may be give priority to center objects.

Figure 6:
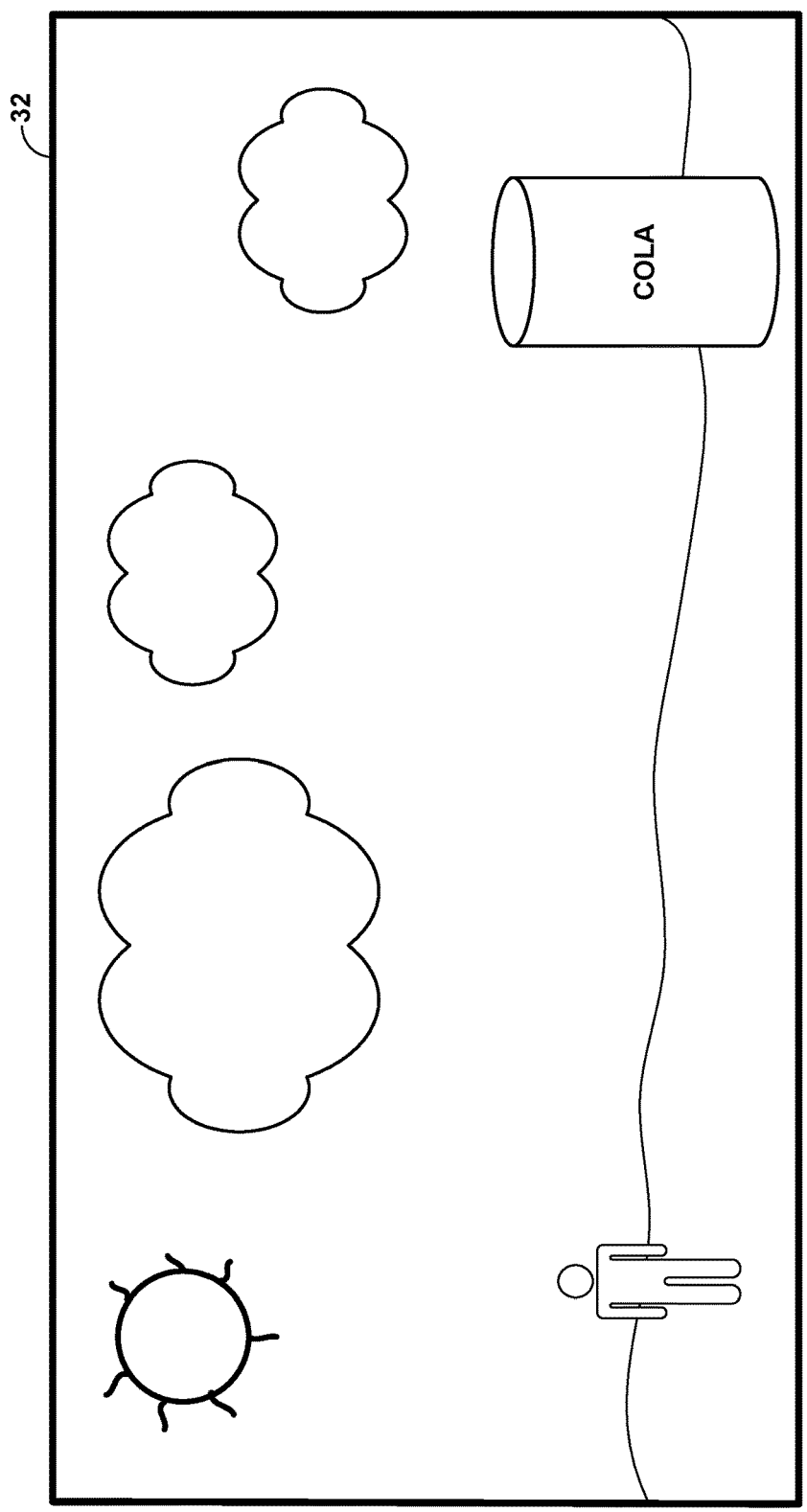
FIG. 6 is a conceptual diagram illustrating an example image with associated depth information.

However, in FIG. 6, the actual subject of the image is the soda can. This subject may be very hard to determine, given the face, landscape, and lack of center objects in the scene. Accordingly, this disclosure proposes to use depth information as an additional factor to use when determining the actual subject of an image. As one example, depth information may be used to prioritize close-up objects, and an AEC process 20 may be configured to use closer objects as one of the priorities for exposure control. Like with AWB process 22, AEC process 20 may assign weights to various areas of the image in order to determine what AEC settings to choose.

For example, AEC process 20 may apply a higher weight to choosing AEC settings optimized for a close object in the scene if the depth associated with the close object is less than some predetermined threshold. In another example, AEC process 20 may apply a higher weight to choosing landscape AEC settings (e.g., an optimized histogram) if the depth information of the scene indicates that some predetermined percentage of the scene has depth information that is greater than some predetermined threshold, thus increasing the probability that the intended subject is a landscape. For example, if all objects in the scene are far away, as indicated by the depth information, exposure settings may be more likely to be set using a frame average of luminance values (e.g., as opposed to setting exposure more locally, as for a face).

In some examples, AEC process 20 may use depth information as one of many priorities for determining exposure settings, and may be weighted according to preference. For example, it may be preferable to assign higher weights to center object and face detection priorities, with lower weights assigned for optimized histograms or object distance (e.g., the depth information). In this way, the depth information may be used to assist in determining exposure settings when other higher priorities are inconclusive.

Figure 7:
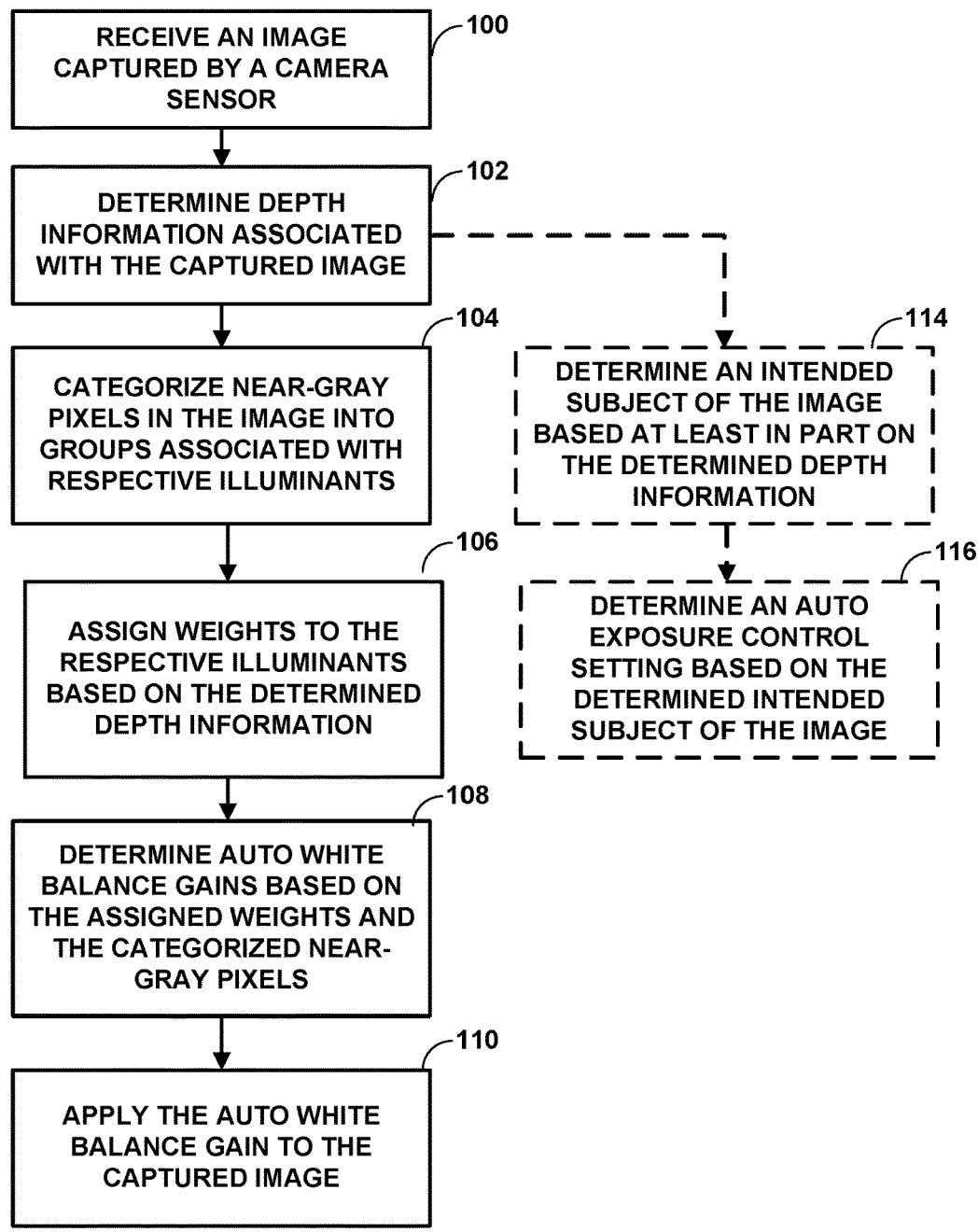
FIG. 7 is a flowchart illustrating an example method according to the techniques of the disclosure.

FIG. 7 is a flowchart illustrating an example method according to the techniques of the disclosure. The techniques of FIG. 7 may be performed by one or more processors, including image signal processor 6 of FIG. 2.

In one example of the disclosure, image signal processor 6 may be configured to receive an image captured by an image sensor (100), and determine depth information associated with the captured image (102). Image signal processor 6 may be further configured to categorize near-gray pixels in the image into groups associated with respective illuminants of the plurality of illuminants based on respective reference points of the respective illuminants of the plurality of illuminants (104). Image signal processor 6 may be further configured to assign weights to a plurality of illuminants based on the determined depth information (106).

Image signal processor 6 may then determine an auto white balance gain based on the assigned weights and statistics of the captured image, e.g., the categorized near-gray pixels (108). Image signal processor 6 may apply the auto white balance gain to the captured image (110).

In a further example of the disclosure, image signal processor 6 may determine a current illuminant based on the determined auto white balance gain, the current illuminant being defined by a correlated color temperature (CCT). Image signal processor 6 may further determine a color correction matrix (CCM) based on the CCT of the current illuminant, and perform a color balance process using the CCM on the captured image after applying the auto white balance gain to the captured image.

In one example of the disclosure, to detect the depth information associated with the captured image, image signal processor 6 is further configured to detect the depth information at a plurality of locations in the captured image. In another example of the disclosure, image signal processor 6 is further configured to determine whether the image was captured indoors or outdoors based on the determined depth information.

In one example, image signal processor 6 is further configured to determine whether the image was captured indoors or outdoors based on one or more of a maximum depth of the depth information, an average depth of the depth information, or a difference between a minimum and a maximum depth of the depth information. Image signal processor 6 may assign relatively higher weights to outdoor illuminants of the plurality of illuminants in the case that the determined depth information indicates the image was captured outdoors, and assign relatively lower weights to indoor illuminants of the plurality of illuminants in the case that the determined depth information indicates the image was captured outdoors. In another example, image processor 6 may assign relatively lower weights to outdoor illuminants of the plurality of illuminants in the case that the determined depth information indicates the image was captured indoors, and assign relatively higher weights to indoor illuminants of the plurality of illuminants in the case that the determined depth information indicates the image was captured indoors.

In another example of the disclosure, image signal processor 6 is further configured to determine an auto exposure control setting based on the determined depth information. For example, image signal processor 6 is further configured to determine an intended subject of the image based at least in part on the determined depth information (114), and determine the auto exposure control setting based on the determined intended subject of the image (116).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for image processing, the method comprising:
   receiving an image captured by an image sensor;
   determining depth information associated with the captured image;
   assigning weights to a plurality of illuminants based on the determined depth information;
   determining an auto white balance gain based on the assigned weights and statistics of the captured image; and
   outputting the auto white balance gain.

2. The method of claim 1, further comprising:
   determining a current illuminant based on the determined auto white balance gain, the current illuminant being defined by a correlated color temperature (CCT); and
   determining a color correction matrix (CCM) based on the CCT of the current illuminant.

3. The method of claim 1, wherein detecting the depth information associated with the captured image comprises detecting the depth information at a plurality of locations in the captured image.

4. The method of claim 1, wherein the statistics of the captured image include a number of near-gray pixels in the image for each of the plurality of illuminants, the method further comprising:
   categorizing near-gray pixels in the image into groups associated with respective illuminants of the plurality of illuminants based on respective reference points of the respective illuminants of the plurality of illuminants.

5. The method of claim 1, further comprising:
   determining whether the image was captured indoors or outdoors based on the determined depth information.

6. The method of claim 5, wherein determining whether the image was captured indoors or outdoors comprises:
   determining whether the image was captured indoors or outdoors based on one or more of a maximum depth of the depth information, an average depth of the depth information, or a difference between a minimum and a maximum depth of the depth information.

7. The method of claim 5, wherein assigning weights to the plurality of illuminants comprises:
   assigning relatively higher weights to outdoor illuminants of the plurality of illuminants in the case that the determined depth information indicates the image was captured outdoors; and
   assigning relatively lower weights to indoor illuminants of the plurality of illuminants in the case that the determined depth information indicates the image was captured outdoors.

8. The method of claim 5, wherein assigning weights to the plurality of illuminants comprises:
   assigning relatively lower weights to outdoor illuminants of the plurality of illuminants in the case that the determined depth information indicates the image was captured indoors; and
   assigning relatively higher weights to indoor illuminants of the plurality of illuminants in the case that the determined depth information indicates the image was captured indoors.

9. The method of claim 1, further comprising:
   determining an auto exposure control setting based on the determined depth information.

10. The method of claim 9, wherein determining the auto exposure control setting comprises:
    determining an intended subject of the image based at least in part on the determined depth information; and
    determining the auto exposure control setting based on the determined intended subject of the image.

11. An apparatus configured for image processing, the apparatus comprising:
    a memory configured to store an image captured by an image sensor; and
    one or more processors in communication with the memory, the one or processors configured to:
    receive the image;
    determine depth information associated with the captured image;
    assign weights to a plurality of illuminants based on the determined depth information;
    determine an auto white balance gain based on the assigned weights and statistics of the captured image; and
    output the auto white balance gain.

12. The apparatus of claim 11, wherein the one or more processors are further configured to:
   determine a current illuminant based on the determined auto white balance gain, the current illuminant being defined by a correlated color temperature (CCT); and
   determine a color correction matrix (CCM) based on the CCT of the current illuminant.

13. The apparatus of claim 11, wherein to detect the depth information associated with the captured image, the one or more processors are further configured to detect the depth information at a plurality of locations in the captured image.

14. The apparatus of claim 11, wherein the statistics of the captured image include a number of near-gray pixels in the image for each of the plurality of illuminants, and wherein the one or more processors are further configured to:
   categorize near-gray pixels in the image into groups associated with respective illuminants of the plurality of illuminants based on respective reference points of the respective illuminants of the plurality of illuminants.

15. The apparatus of claim 11, wherein the one or more processors are further configured to:
   determine whether the image was captured indoors or outdoors based on the determined depth information.

16. The apparatus of claim 15, wherein to determine whether the image was captured indoors or outdoors, the one or more processors are further configured to:
   determine whether the image was captured indoors or outdoors based on one or more of a maximum depth of the depth information, an average depth of the depth information, or a difference between a minimum and a maximum depth of the depth information.

17. The apparatus of claim 15, wherein to assign weights to the plurality of illuminants, the one or more processors are further configured to:
   assign relatively higher weights to outdoor illuminants of the plurality of illuminants in the case that the determined depth information indicates the image was captured outdoors; and
   assign relatively lower weights to indoor illuminants of the plurality of illuminants in the case that the determined depth information indicates the image was captured outdoors.

18. The apparatus of claim 15, wherein to assign weights to the plurality of illuminants, the one or more processors are further configured to:
   assign relatively lower weights to outdoor illuminants of the plurality of illuminants in the case that the determined depth information indicates the image was captured indoors; and
   assign relatively higher weights to indoor illuminants of the plurality of illuminants in the case that the determined depth information indicates the image was captured indoors.

19. The apparatus of claim 11, wherein the one or more processors are further configured to:
   determine an auto exposure control setting based on the determined depth information.

20. The apparatus of claim 19, wherein to determine the auto exposure control setting, the one or more processors are further configured to:
   determine an intended subject of the image based at least in part on the determined depth information; and
   determine the auto exposure control setting based on the determined intended subject of the image.

21. The apparatus of claim 11, further comprising:
   the image sensor configured to capture the image and the depth information.

22. The apparatus of claim 21, wherein the image sensor comprises one or more of a dual camera system, a dual photodiode sensor, or a time-of-flight camera.

23. A non-transitory computer-readable storage medium storage medium storing instructions that, when executed, cause one or more processors of a device configured for image processing to:
   receive an image captured by an image sensor;
   determine depth information associated with the captured image;
   assign weights to a plurality of illuminants based on the determined depth information;
   determine an auto white balance gain based on the assigned weights and statistics of the captured image; and
   output the auto white balance gain.

24. The non-transitory computer-readable storage medium of claim 23, wherein the instructions further cause the one or more processors to:
   determine whether the image was captured indoors or outdoors based on the determined depth information.

25. The non-transitory computer-readable storage medium of claim 24, wherein to determine whether the image was captured indoors or outdoors, the instructions further cause the one or more processors to:
   determine whether the image was captured indoors or outdoors based on one or more of a maximum depth of the depth information, an average depth of the depth information, or a difference between a minimum and a maximum depth of the depth information.

26. The non-transitory computer-readable storage medium storage medium of claim 23, wherein the instructions further cause the one or more processors to:
   determine a current illuminant based on the determined auto white balance gain, the current illuminant being defined by a correlated color temperature (CCT); and
   determine a color correction matrix (CCM) based on the CCT of the current illuminant.

* * * * *